United States Patent
Kudo

(10) Patent No.: US 10,752,287 B2
(45) Date of Patent: Aug. 25, 2020

(54) STEER-BY-WIRE SYSTEM

(71) Applicant: TOYOTA JIDOSHA KABUSHIKI KAISHA, Toyota-shi, Aichi-ken (JP)

(72) Inventor: Yoshio Kudo, Machida (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 203 days.

(21) Appl. No.: 16/059,312

(22) Filed: Aug. 9, 2018

(65) Prior Publication Data

US 2019/0100241 A1 Apr. 4, 2019

(30) Foreign Application Priority Data

Oct. 3, 2017 (JP) .................... 2017-193545
Nov. 6, 2017 (JP) .................... 2017-214030

(51) Int. Cl.
  B62D 6/00 (2006.01)
  B62D 5/00 (2006.01)
  B62D 15/02 (2006.01)
  B62D 5/04 (2006.01)

(52) U.S. Cl.
  CPC ........... B62D 6/008 (2013.01); B62D 5/006 (2013.01); B62D 15/022 (2013.01); B62D 5/046 (2013.01)

(58) Field of Classification Search
  CPC .................... B62D 6/02; B62D 5/06
  See application file for complete search history.

(56) References Cited

U.S. PATENT DOCUMENTS

| | | | | |
|---|---|---|---|---|
| 6,145,215 A | * | 11/2000 | Graston | G01B 3/004 33/679.1 |
| 2005/0246101 A1 | * | 11/2005 | Courtenay | B62D 15/025 701/301 |
| 2006/0208564 A1 | * | 9/2006 | Yuda | B60T 8/1755 303/146 |
| 2009/0026003 A1 | * | 1/2009 | Kato | B62D 5/008 180/446 |
| 2009/0271074 A1 | * | 10/2009 | Hulten | B62D 6/003 701/42 |
| 2009/0319128 A1 | * | 12/2009 | Lauer | B60W 50/16 701/42 |
| 2016/0272197 A1 | * | 9/2016 | Hulten | B62D 6/003 |

FOREIGN PATENT DOCUMENTS

JP 2004-034923 A 2/2004

* cited by examiner

*Primary Examiner* — Tony H Winner
(74) *Attorney, Agent, or Firm* — Sughrue Mion, PLLC

(57) ABSTRACT

A steer-by-wire system includes a turning device that turns a vehicle wheel; and a steering reaction force control unit that controls a steering reaction force applied to a steering wheel. The steering reaction force control unit is configured to calculate a plurality of kinds of axial forces, calculate a final axial force based on the axial forces, and generate the steering reaction force corresponding to the final axial force. The axial forces include a basic axial force, and an under axial force that becomes smaller than the basic axial force during understeer. The steering reaction force control unit is configured to calculate a degree of understeer reflecting a difference between the basic axial force and the under axial force during the understeer and to reduce the final axial force during the understeer to a value smaller than the basic axial force by an amount corresponding to the degree of understeer.

10 Claims, 8 Drawing Sheets

1: STEER-BY-WIRE SYSTEM

STEER-BY-WIRE SYSTEM

INCORPORATION BY REFERENCE

The disclosure of Japanese Patent Application No. 2017-214030 filed on Nov. 6, 2017 including the specification, drawings and abstract is incorporated herein by reference in its entirety.

BACKGROUND

1. Technical Field

The disclosure relates to a steer-by-wire system.

2. Description of Related Art

A steer-by-wire vehicle has been known. In the case of the steer-by-wire vehicle, a turning mechanism configured to turn wheels is mechanically separated from a steering wheel. Instead, the turning mechanism is provided with an electric motor. The wheels are turned when the electric motor is driven in accordance with an operation of the steering wheel. In order to provide a driver with steering feeling, a pseudo steering reaction force is applied to the steering wheel.

A steer-by-wire steering control device is disclosed in Japanese Patent Application Publication No. 2004-034923 (JP 2004-034923 A). The turning mechanism includes a turning actuator that drives turning wheels. A turning reaction force is applied to the turning mechanism due to a road surface reaction force or the like. The turning reaction force is detected with the use of a sensor, or the turning reaction force is estimated with the use of a disturbance observer. A steering mechanism includes a steering actuator that applies a steering reaction force to the steering wheel. A control amount of the steering actuator is decided on the basis of steering torque, the turning reaction force, a time derivative of the turning reaction force, and the like.

SUMMARY

In the technique disclosed in JP 2004-034923 A described above, no consideration is given to steering control when a vehicle state is in a critical range such as an understeer range or an oversteer range. However, also when the vehicle state is in the critical range, it is desired to reproduce the appropriate steering feeling that corresponds to the vehicle state.

The disclosure provides a steer-by-wire system capable of reproducing steering feeling that corresponds to a vehicle state in a critical range such as an understeer range or an oversteer range.

A first aspect of the disclosure relates to a steer-by-wire system mounted in a vehicle. The steer-by-wire system includes a turning device configured to turn a wheel of the vehicle; and a steering reaction force control unit configured to control a steering reaction force applied to a steering wheel. The steering reaction force control unit is configured to calculate a plurality of kinds of axial forces with use of different parameters, calculate a final axial force based on the plurality of kinds of axial forces, and generate the steering reaction force corresponding to the final axial force. The plurality of kinds of axial forces include a basic axial force that is calculated based on a turning angle of the wheel or a steering angle of the steering wheel, and an under axial force that becomes smaller than the basic axial force during understeer. The steering reaction force control unit is configured to calculate a degree of understeer that reflects a difference between the basic axial force and the under axial force during the understeer and to reduce the final axial force during the understeer to a value smaller than the basic axial force by an amount corresponding to the degree of understeer.

According to the first aspect, the basic axial force and the under axial force, which becomes smaller than the basic axial force during the understeer, are calculated. By comparing the basic axial force and the under axial force, understeer can be easily detected, and the degree of understeer can be easily calculated. In addition, the final axial force during the understeer is smaller than the basic axial force by a reduction amount corresponding to the degree of understeer. Accordingly, the steering reaction force during the understeer becomes smaller than the steering reaction force corresponding to the basic axial force. Thus, it is possible to reproduce the "steering force reducing feeling" (i.e., the feeling that the steering force is reduced) received by a driver during the understeer.

A second aspect of the disclosure relates to a steer-by-wire system mounted in a vehicle. The steer-by-wire system includes a turning device configured to turn a wheel of the vehicle; and a steering reaction force control unit configured to control a steering reaction force applied to a steering wheel. The steering reaction force control unit is configured to calculate a plurality of kinds of axial forces with use of different parameters, calculate a final axial force based on the plurality of kinds of axial forces, and generate the steering reaction force corresponding to the final axial force. The plurality of kinds of axial forces include a basic axial force that is calculated based on a turning angle of the wheel or a steering angle of the steering wheel, and an over axial force that becomes larger than the basic axial force during oversteer. The steering reaction force control unit is configured to calculate a degree of oversteer that reflects a difference between the basic axial force and the over axial force during oversteer and increase the final axial force during oversteer to be larger than the basic axial force by an amount corresponding to the degree of oversteer.

According to the second aspect, the basic axial force and the over axial force, which becomes larger than the basic axial force during the oversteer, are calculated. By comparing the basic axial force and the over axial force, oversteer can be easily detected, and the degree of oversteer can be easily calculated. In addition, the final axial force during the oversteer is larger than the basic axial force by an increase amount corresponding to the degree of oversteer. Accordingly, the steering reaction force during the oversteer is larger than the steering reaction force corresponding to the basic axial force. Thus, the steering wheel can be easily turned back. That is, a countersteering operation during the oversteer is assisted. Thus, the driver finds it easy to perform the countersteering operation.

As described above, the steer-by-wire system according to the above aspects of the disclosure can reproduce appropriate steering feeling that corresponds to a vehicle state. In particular, even when the vehicle state is in a critical range such as an understeer range or an oversteer range, the appropriate steering feeling that corresponds to the vehicle state can be reproduced.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

A description will be provided on an embodiment of the disclosure with reference to the accompanying drawings.

Figure 1:
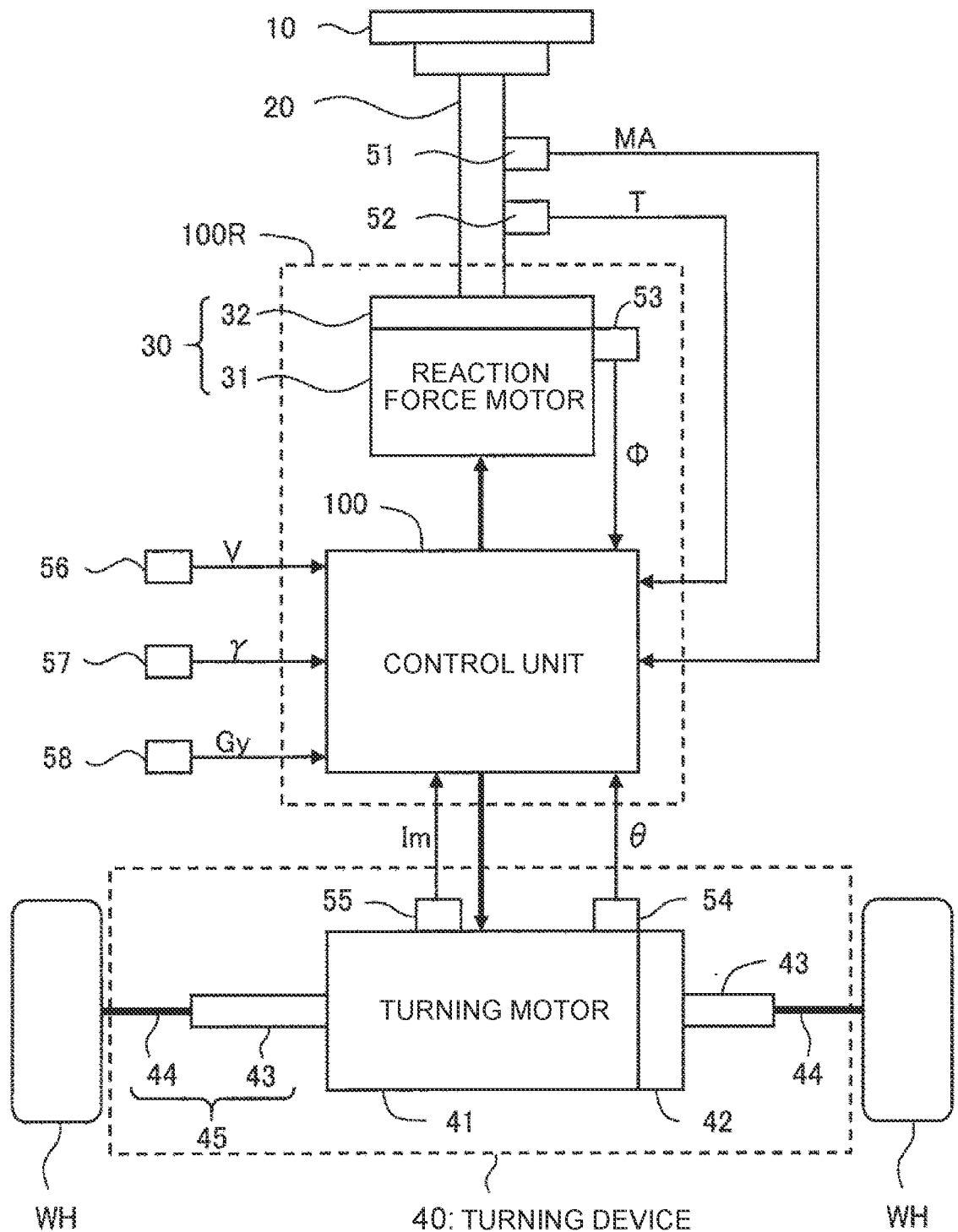
FIG. 1 is a block diagram that schematically shows a configuration example of a steer-by-wire system according to an embodiment of the disclosure.

FIG. 1 is a block diagram that schematically shows a configuration example of a steer-by-wire system 1 according to this embodiment of the disclosure. The steer-by-wire system 1 is mounted on a vehicle and turns wheels WH (turning wheels) of the vehicle in a steer-by-wire manner. As shown in FIG. 1, the steer-by-wire system 1 includes a steering wheel 10, a steering shaft 20, a reaction force generator 30, a turning device 40, sensors 51 to 58, and a control unit 100.

The steering wheel 10 is an operation member used by a driver for steering. The steering shaft 20 is coupled to the steering wheel 10 and rotates together with the steering wheel 10.

The reaction force generator 30 applies a pseudo-steering reaction force to the steering wheel 10. This reaction force generator 30 includes a reaction force motor 31 and a deceleration mechanism 32. A rotor of the reaction force motor 31 is connected to the steering shaft 20 via the deceleration mechanism 32. When the reaction force motor 31 is operated, the pseudo-steering reaction force can be applied to the steering shaft 20 and to the steering wheel 10. An operation of this reaction force motor 31 is controlled by the control unit 100.

The turning device 40 turns the wheels WH. This turning device 40 includes a turning motor 41, a deceleration mechanism 42, a turning bar 43, and tie rods 44. A rotor of the turning motor 41 is connected to the turning bar 43 via the deceleration mechanism 42. The turning bar 43 is coupled to the wheels WH via the tie rods 44. Hereinafter, the turning bar 43 and the tie rods 44 will be collectively referred to as a turning shaft 45. The turning bar 43 may be provided for each wheel WH, and each turning bar 43 may be coupled to the corresponding wheel WH via the corresponding tie rod 44, and thus, each turning bar 43 and the corresponding tie rod 44 may be collectively referred to as the turning shaft 45. The turning motor 41 is connected to the wheels WH via the deceleration mechanism 42 and the turning shaft 45. When the turning motor 41 rotates, rotary motion thereof is converted to linear motion of the turning shaft 45, and the wheels WH are thereby turned. That is, when the turning motor 41 is operated, the wheels WH can be turned. An operation of this turning motor 41 is controlled by the control unit 100.

A steering wheel angle sensor 51 detects a steering wheel angle MA that is a steering angle of the steering wheel 10. The steering wheel angle sensor 51 sends information on the detected steering wheel angle MA to the control unit 100.

A steering torque sensor 52 detects steering torque T that is applied to the steering shaft 20. The steering torque sensor 52 sends information on the detected steering torque T to the control unit 100.

A rotation angle sensor 53 detects a rotation angle $\phi$ of the reaction force motor 31 in the reaction force generator 30. The rotation angle sensor 53 sends information on the detected rotation angle $\phi$ to the control unit 100.

A rotation angle sensor 54 detects a rotation angle of the turning motor 41 in the turning device 40. The rotation angle of the turning motor 41 corresponds to a turning angle $\theta$ of the wheel WH. Thus, the rotation angle sensor 54 detects the turning angle $\theta$ of the wheel WH. The rotation angle sensor 54 sends information on the detected turning angle $\theta$ to the control unit 100.

A turning current sensor 55 detects a turning current Im that drives the turning motor 41. The turning current sensor 55 sends information on the detected turning current Im to the control unit 100.

A vehicle speed sensor 56 detects a vehicle speed V that is a speed of the vehicle. The vehicle speed sensor 56 sends information on the detected vehicle speed V to the control unit 100. Note that, instead of the vehicle speed sensor 56, a wheel rotational speed sensor may be used to calculate the vehicle speed V from a rotational speed of each of the wheels.

A yaw rate sensor 57 detects a yaw rate $\gamma$ of the vehicle. The yaw rate sensor 57 sends information on the detected yaw rate $\gamma$ to the control unit 100.

A lateral acceleration sensor 58 detects lateral acceleration Gy that is applied to the vehicle. The lateral acceleration sensor 58 sends information on the detected lateral acceleration Gy to the control unit 100.

The control unit 100 controls the steer-by-wire system 1 according to this embodiment. The control unit 100 includes a microcomputer including a processor, memory, and an input/output interface. The microcomputer is also referred to as an electronic control unit (ECU). The control unit 100 receives the detected information from the sensors 51 to 58 and controls the steer-by-wire system 1 on the basis of the detected information.

More specifically, the control unit 100 controls turning of the wheels WH by executing drive control for the turning motor 41 in the turning device 40. For example, the control unit 100 calculates a target turning angle on the basis of the steering wheel angle MA and the like. Then, the control unit 100 generates a control signal for driving the turning motor 41 on the basis of the turning angle $\theta$ that is detected by the rotation angle sensor 54 and the target turning angle. The turning motor 41 is driven in accordance with the control signal, and the wheels WH are turned by the rotation of the turning motor 41. Note that a current that drives the turning motor 41 at this time is the turning current Im.

The control unit 100 also controls the steering reaction force that is applied to the steering wheel 10 by executing drive control for the reaction force motor 31 in the reaction force generator 30. More specifically, the control unit 100 calculates a target steering reaction force on the basis of the detected information from the sensors (the calculation of this target steering reaction force will be described in detail below). Then, the control unit 100 executes the drive control for the reaction force motor 31 to cause the reaction force motor 31 to generate the target steering reaction force. For example, the control unit 100 generates a control signal for driving the reaction force motor 31 on the basis of the target steering reaction force, the rotation angle φ of the reaction force motor 31, the steering torque T, and the like. The reaction force motor 31 is driven in accordance with the control signal and thereby generates the steering reaction force.

The control unit 100 and the reaction force generator 30 constitute a "steering reaction force control unit 100R". The steering reaction force control unit 100R generates the steering reaction force by using the reaction force motor 31 and applies the steering reaction force to the steering wheel 10. In addition, the steering reaction force control unit 100R controls the steering reaction force. Hereinafter, steering reaction force control according to this embodiment will be described in detail.

A plurality of kinds of axial forces will be described. In view of steering feeling given to the driver, it is preferable that the steering reaction force should be determined (decided) in consideration of a reaction force that is applied to the turning shaft 45 from a road surface via the wheels WH. In the following description, a parameter (a component) that corresponds to the reaction force applied to the turning shaft 45 will be referred to as an "axial force". In the steering reaction force control according to this embodiment, "a plurality of kinds of axial forces" based on the different parameters will be considered. Dimensions of the plurality of kinds of axial forces are unified. In the following example, a dimension (m/s$^2$) of the lateral acceleration Gy will be used as the dimension of each of the plurality kinds of axial forces.

A first axial force AF1 is calculated on the basis of the turning angle θ (deg) and the vehicle speed V (m/s). For example, the first axial force AF1 is expressed by the following equation (1).

(Equation 1)

$$AF1 = \frac{1}{1+K_h V^2} \frac{V^2}{l} \frac{\theta}{N} \quad (1)$$

Here, l is a wheelbase (m), and N is an overall gear ratio. $K_h$ is a stability factor and is expressed by the following equation (2).

(Equation 2)

$$K_h = -\frac{m}{2l^2} \frac{l_f K_f - l_r K_r}{K_f K_r} \quad (2)$$

Here, m is a vehicle mass (kg). $l_f$ is a distance (m) between the center of gravity of the vehicle and a front axle, and $l_r$ is a distance (m) between the center of gravity of the vehicle and a rear axle. $K_f$ is front wheel cornering power (N/rad), and $K_r$ is rear wheel cornering power (N/rad).

In the case of the equation (1), the first axial force AF1 is proportional to the turning angle θ. That is, as the turning angle θ is increased, the first axial force AF1 is increased. When a transient property is taken into account, the first axial force AF1 is expressed by the following equation (3).

(Equation 3)

$$AF1 = \frac{1}{1+K_h V^2} \frac{V^2}{l} \frac{\omega_n^2 (T_{y2} s^2 + T_{y1} s + 1)}{s^2 + 2\zeta \omega_n s + \omega_n^2} \frac{\theta}{N} \quad (3)$$

Here, $T_{y1}$ and $T_{y2}$ are expressed by the following equation (4) and equation (5), respectively. $\omega_n$ is a natural vibration frequency and is expressed by the following equation (6). ξ is a damping ratio and is expressed by the following equation (7). I is yaw moment of inertia (kg·m).

(Equation 4)

$$T_{y1} = \frac{l_r}{V} \quad (4)$$

(Equation 5)

$$T_{y2} = \frac{I}{2lK_r} \quad (5)$$

(Equation 6)

$$\omega_n = \frac{2l}{V} \sqrt{\frac{K_f K_r}{mI}} \sqrt{1+K_h V^2} \quad (6)$$

(Equation 7)

$$\zeta = -\frac{m(l_f^2 K_f + l_r^2 K_r) + I(K_f + K_r)}{2l\sqrt{mIK_f K_r (1+K_h V^2)}} \quad (7)$$

As described above, the turning angle θ of each of the wheels WH is determined (decided) on the basis of the steering wheel angle MA (the steering angle of the steering wheel 10). Accordingly, the first axial force AF1 may be expressed by an equation that is based on the steering wheel angle MA instead of the turning angle θ. That is, the first axial force AF1 may be calculated on the basis of the steering wheel angle MA instead of the turning angle θ.

A second axial force AF2 is calculated on the basis of the yaw rate γ (rad/s) and the vehicle speed V (m/s). For example, the second axial force AF2 is expressed by the following equation (8).

(Equation 8)

$$AF2 = \gamma \cdot V \quad (8)$$

In the case of the equation (8), the second axial force AF2 is proportional to the yaw rate γ. That is, as the yaw rate γ is increased, the second axial force AF2 is increased.

A third axial force AF3 is calculated on the basis of the lateral acceleration Gy (m/s$^2$). For example, the third axial force AF3 is expressed by the following equation (9).

(Equation 9)

$$AF3 = Gy \quad (9)$$

In the case of the equation (9), the third axial force AF3 is proportional to the lateral acceleration Gy. That is, as the lateral acceleration Gy is increased, the third axial force AF3 is increased.

A fourth axial force AF4 is calculated on the basis of the lateral acceleration Gy (m/s²) and the yaw rate γ (rad/s). For example, the fourth axial force AF4 is expressed by the following equation (10).

(Equation 10)

$$AF4 = Gy + \frac{I}{l_r m} \dot{\gamma} \quad (10)$$

A second term of the equation (10) is a term related to a time derivative of the yaw rate γ. m is the vehicle mass (kg), I is the yaw moment of inertia (kg·m), and $l_r$ is the distance (m) between the center of gravity of the vehicle and the rear axle. A sum of the lateral acceleration Gy and the time derivative of the yaw rate γ corresponds to a lateral force applied to the wheels WH. As the lateral force is increased, the fourth axial force AF4 is increased.

A fifth axial force AF5 is calculated on the basis of the turning current Im (A) for driving the turning motor 41. For example, the fifth axial force AF5 is expressed by the following equation (11).

(Equation 11)

$$AF5 = \frac{Kt}{\xi_n + \xi_c} \frac{I}{l_r m} \text{Im} \quad (11)$$

Here, Kt is a current/torque conversion factor (Nm/A). $\xi_n$ is pneumatic trail (m), and $\xi_c$ is caster trail (m). In the case of the equation (11), the fifth axial force AF5 is proportional to the turning current Im. That is, as the turning current Im is increased, the fifth axial force AF5 is increased.

A basic axial force AF_B is an axial force that serves as a base at the time of determining (deciding) the target steering reaction force. According to this embodiment, the first axial force AF1 described above is used as the basic axial force AF_B. As described above, the first axial force AF1 is changed in accordance with the turning angle θ (the steering wheel angle MA), and is increased as the turning angle θ (the steering wheel angle MA) is increased. The first axial force AF1 is suitable for reproduction of the built-up feeling (the feeling that resistance is increased as the turning angle θ or the steering wheel angle MA is increased).

An under axial force AF_U is an axial force with a property of becoming smaller than the basic axial force AF_B during understeer (i.e., the under axial force AF_U becomes smaller than the basic axial force AF_B during understeer). Note that a magnitude relationship described in this specification signifies a magnitude relationship of absolute values unless otherwise specified. For example, the description that the under axial force AF_U is smaller than the basic axial force AF_B signifies that an absolute value of the under axial force AF_U is smaller than an absolute value of the basic axial force AF_B.

Figure 2:
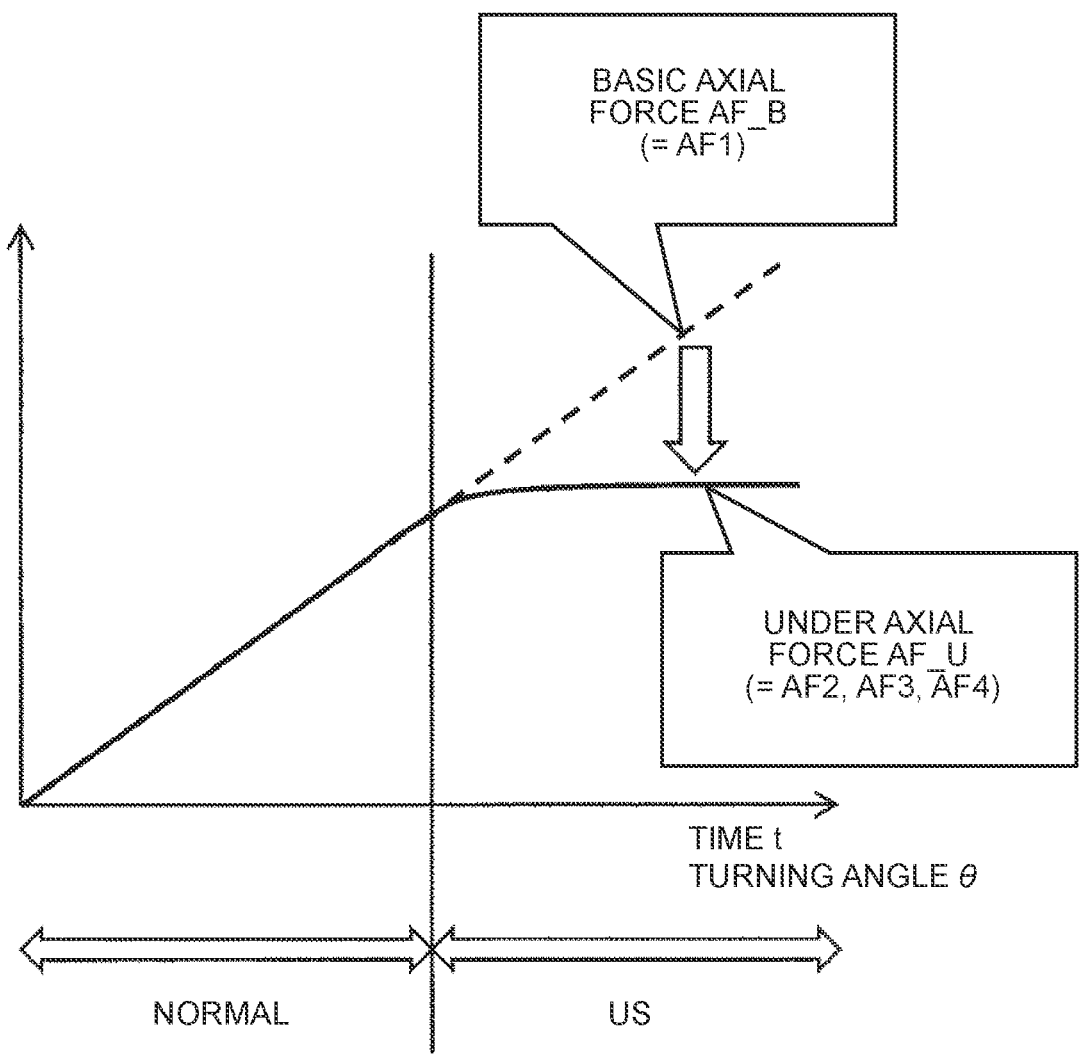
FIG. 2 is a conceptual graph illustrating an under axial force in the embodiment of the disclosure.

FIG. 2 is a conceptual graph illustrating the under axial force AF_U. Here, a case where the steering wheel 10 is operated and both of the steering wheel angle MA and the turning angle θ are increased over time is considered. A horizontal axis in FIG. 2 represents time t and the turning angle θ. Among the plurality of kinds of axial forces described above, the second axial force AF2, the third axial force AF3, and the fourth axial force AF4 each have a property of becoming smaller than the basic axial force AF_B in an understeer (US) state. That is, each of the second axial force AF2, the third axial force AF3, and the fourth axial force AF4 is the under axial force AF_U.

Figure 3:
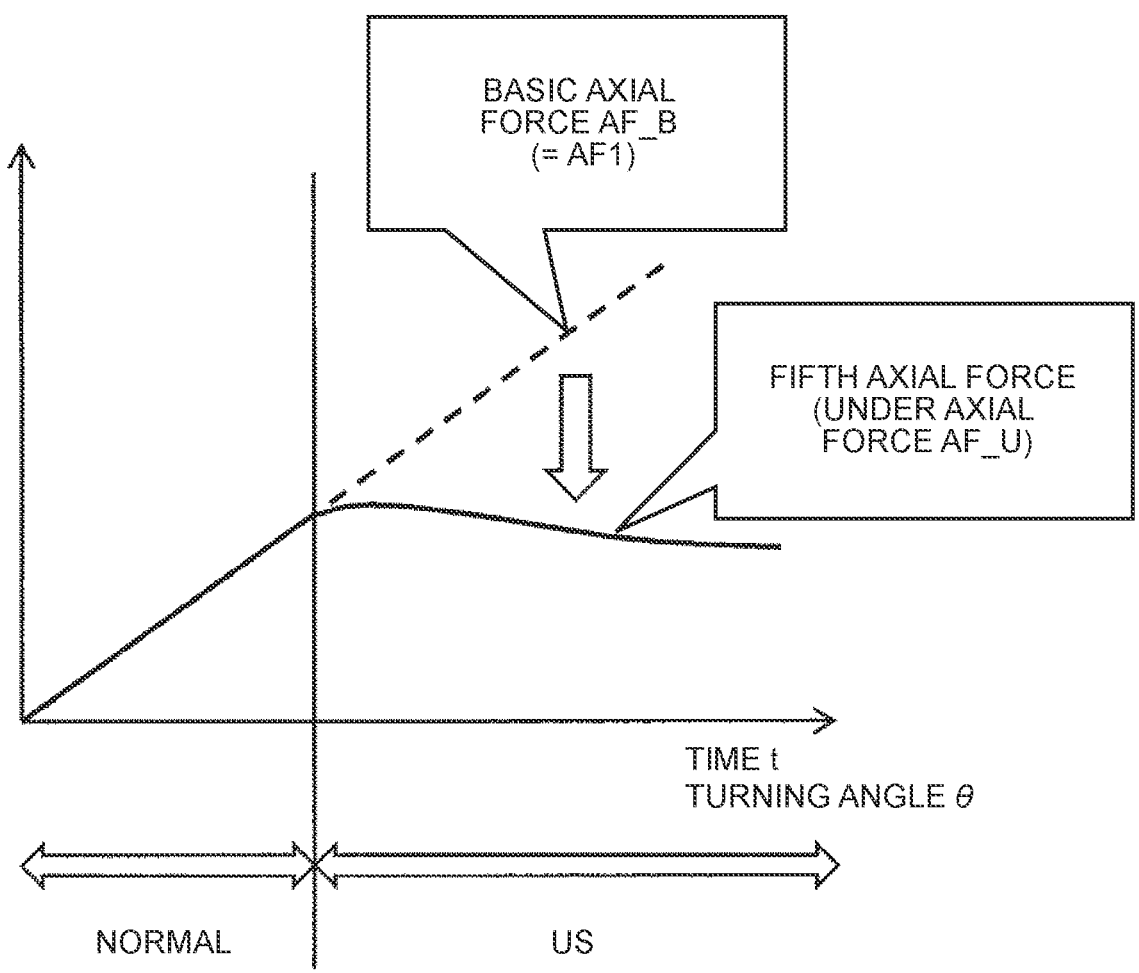
FIG. 3 is a conceptual graph illustrating a fifth axial force as one of the under axial forces in the embodiment of the disclosure.

FIG. 3 is a conceptual graph illustrating the fifth axial force AF5 that is based on the turning current Im. The fifth axial force AF5 also has the property of becoming smaller than the basic axial force AF_B in the understeer (US) state. That is, the fifth axial force AF5 is also the under axial force AF_U. Furthermore, as it is understood from a comparison of FIG. 3 with FIG. 2, the change in the fifth axial force AF5 starts prior to the changes in the other under axial forces AF_U (AF2, AF3, AF4).

The turning motor 41 is driven by the turning current Im. When the turning motor 41 is operated, the turning angle of each of the wheels WH is changed. As a result, the lateral acceleration Gy and the yaw rate γ are changed. That is, the change in the turning current Im occurs prior to the changes in the lateral acceleration Gy and the yaw rate γ. Accordingly, the change in the fifth axial force AF5, which is calculated on the basis of the turning current Im, starts prior to (earlier than) the changes in the other axial forces AF2 to AF4. Thus, the fifth axial force AF5 is referred to as an "early changed axial force".

In this embodiment, at least one of the second axial force AF2, the third axial force AF3, the fourth axial force AF4, and the fifth axial force AF5 is used as the under axial force AF_U.

Figure 4:
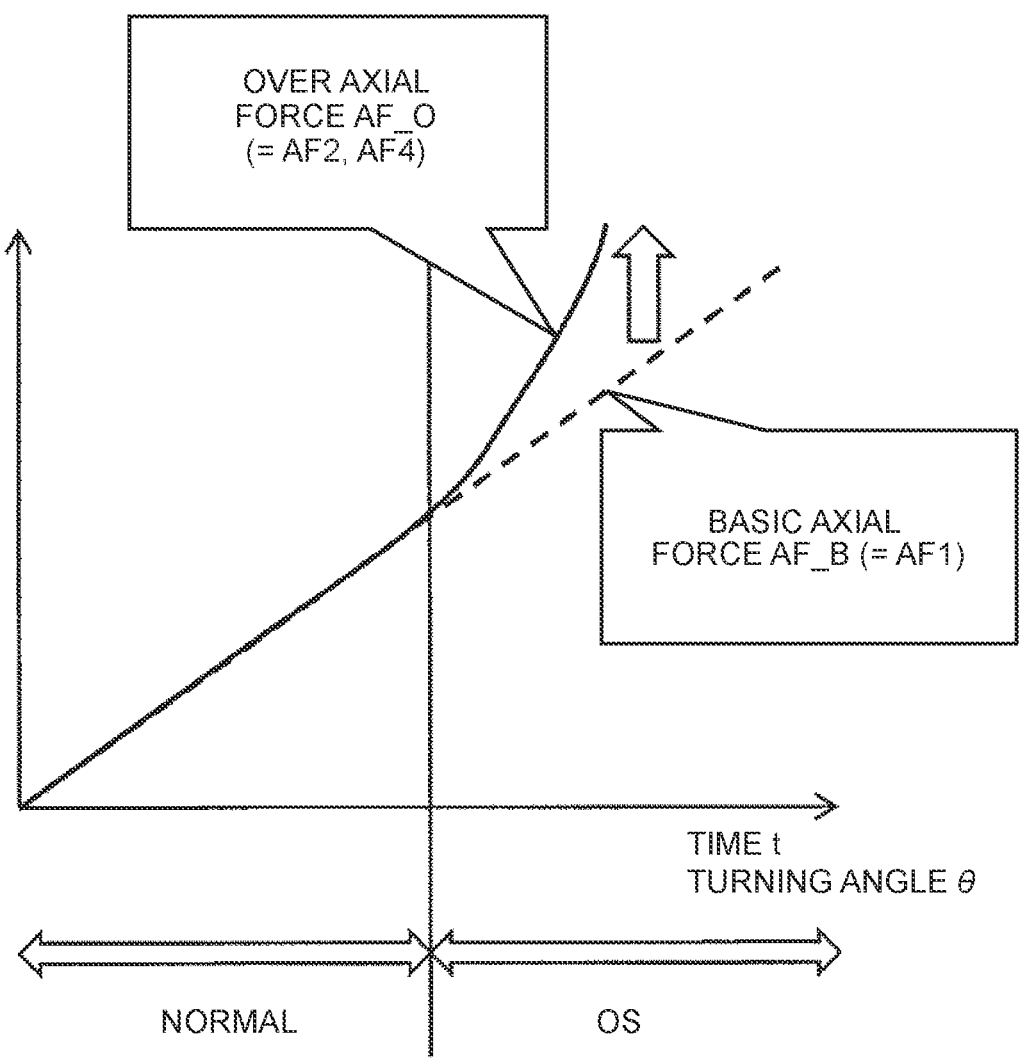
FIG. 4 is a conceptual graph illustrating an over axial force in the embodiment of the disclosure.

An over axial force AF_O is an axial force with a property of becoming larger than the basic axial force AF_B during oversteer (i.e., the over axial force AF_O becomes larger than the basic axial force AF_B during oversteer). FIG. 4 is a conceptual graph illustrating the over axial force AF_O. The same format for FIGS. 2, 3 is used for FIG. 4. Each of the second axial force AF2 and the fourth axial force AF4 is calculated on the basis of the yaw rate γ, and has a property of becoming larger than the basic axial force AF_B in an oversteer (OS) state. That is, each of the second axial force AF2 and the fourth axial force AF4 is the over axial force AF_O. In this embodiment, at least one of the second axial force AF2 and the fourth axial force AF4 is used as the over axial force AF_O.

Note that each of the second axial force AF2 and the fourth axial force AF4 has both the property of the under axial force AF_U and the property of the over axial force AF_O.

Figure 5:
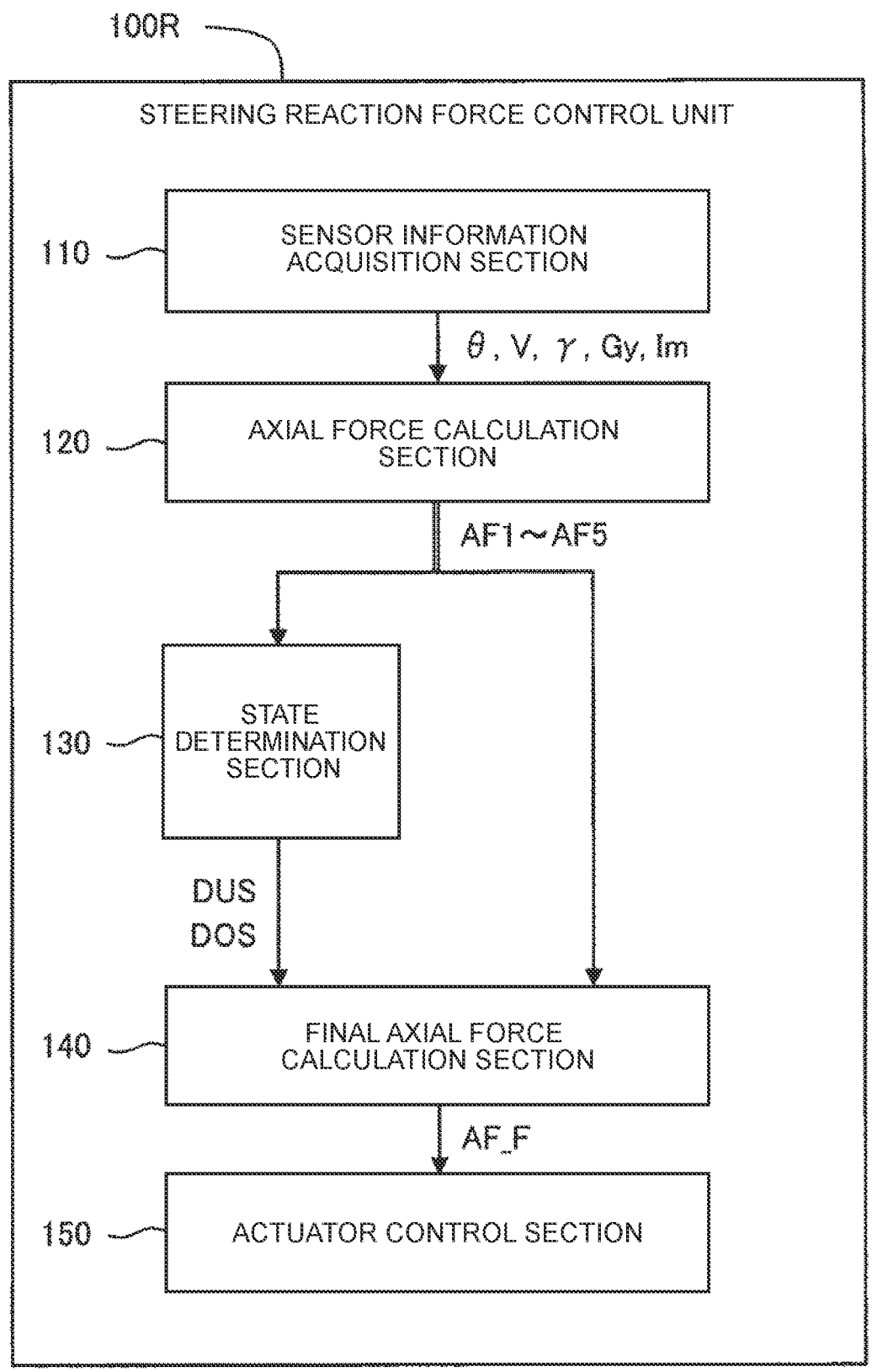
FIG. 5 is a block diagram of a functional configuration of a steering reaction force control unit in the steer-by-wire system according to the embodiment of the disclosure.

FIG. 5 is a block diagram of a functional configuration of the steering reaction force control unit 100R (the control unit 100) according to this embodiment. The steering reaction force control unit 100R includes, as functional blocks, a sensor information acquisition section 110, an axial force calculation section 120, a state determination section 130, a final axial force calculation section 140, and an actuator control section 150.

The sensor information acquisition section 110 acquires the detected information from the sensors 51 to 58.

The axial force calculation section 120 calculates the plurality of kinds of axial forces by using the different parameters. The plurality of kinds of axial forces that are calculated include at least the basic axial force AF_B, the under axial force AF_U, and the over axial force AF_O. For example, the axial force calculation section 120 calculates the above-mentioned axial forces AF1 to AF5 on the basis of the turning angle θ (or the steering wheel angle MA), the vehicle speed V, the yaw rate γ, the lateral acceleration Gy, and the turning current Im.

The state determination section 130 determines whether a vehicle state is in a normal range or a critical range (an understeer range or an oversteer range) on the basis of the plurality of kinds of axial forces that are calculated. In detail, the state determination section 130 determines the vehicle state by comparing the basic axial force AF_B, the under axial force AF_U, and the over axial force AF_O.

For example, in the case where the under axial force AF_U is smaller than the basic axial force AF_B (AF_U<AF_B), the state determination section 130 determines that the vehicle state has an understeer tendency. At this time, the state determination section 130 calculates a "degree of understeer DUS" that reflects a difference between the basic axial force AF_B and the under axial force AF_U. When the difference between the basic axial force AF_B and the under axial force AF_U is increased during understeer, the degree of understeer DUS is increased (intensified).

In the case where the over axial force AF_O is larger than the basic axial force AF_B (AF_O>AF_B), the state determination section 130 determines that the vehicle state has an oversteer tendency. At this time, the state determination section 130 calculates a "degree of oversteer DOS" that reflects a difference between the basic axial force AF_B and the over axial force AF_O. When the difference between the basic axial force AF_B and the over axial force AF_O is increased during oversteer, the degree of oversteer DOS is increased (intensified).

The final axial force calculation section 140 calculates a "final axial force AF_F" that is used to calculate the target steering reaction force. In particular, on the basis of the plurality kinds of axial forces, the degree of understeer DUS, and the degree of oversteer DOS, the final axial force calculation section 140 calculates the appropriate final axial force AF_F that corresponds to the vehicle state.

In detail, during understeer, the final axial force calculation section 140 calculates, as the final axial force AF_F, the axial force that is smaller than the basic axial force AF_B by a reduction amount corresponding to the degree of understeer DUS. In other words, the final axial force calculation section 140 reduces the final axial force AF_F during understeer to a value smaller than the basic axial force AF_B by the reduction amount corresponding to the degree of understeer DUS.

During oversteer, the final axial force calculation section 140 calculates, as the final axial force AF_F, the axial force that is larger than the basic axial force AF_B by an increase amount corresponding to the degree of oversteer DOS. In other words, the final axial force calculation section 140 increases the final axial force AF_F during oversteer to a value larger than the basic axial force AF_B by the increase amount corresponding to the degree of oversteer DOS.

The actuator control section 150 calculates the target steering reaction force from the final axial force AF_F. As the final axial force AF_F is increased, the target steering reaction force is increased. Then, the actuator control section 150 executes the drive control for the reaction force motor 31 to cause the reaction force motor 31 to generate the target steering reaction force. For example, the actuator control section 150 generates the control signal for driving the reaction force motor 31 on the basis of the target steering reaction force, the rotation angle θ of the reaction force motor 31, the steering torque T, and the like. The reaction force motor 31 is driven in accordance with the control signal and thereby generates the steering reaction force.

As it has been described so far, according to this embodiment, the plurality of kinds of axial forces that include the basic axial force AF_B, the under axial force AF_U, and the over axial force AF_O are calculated. By comparing the basic axial force AF_B, the under axial force AF_U, and the over axial force AF_O, understeer or oversteer can be easily detected, and the degree of understeer DUS or the degree of oversteer DOS can be easily calculated.

The basic axial force AF_B is calculated on the basis of the turning angle θ (or the steering wheel angle MA). As the turning angle θ (or the steering wheel angle MA) is increased, the basic axial force AF_B is increased. The steering reaction force is generated on the basis of the basic axial force AF_B. In this way, the appropriate built-up feeling (the feeling that the resistance is increased as the turning angle θ or the steering wheel angle MA is increased) can be reproduced.

The final axial force AF_F during understeer is smaller than the basic axial force AF_B by the reduction amount corresponding to the degree of understeer DUS. Accordingly, the steering reaction force during understeer is smaller than the steering reaction force corresponding to the basic axial force AF_B. In this way, the "steering force reducing feeling (i.e., the feeling that the steering force is reduced)" received by the driver during understeer can be reproduced.

The final axial force AF_F during oversteer is larger than the basic axial force AF_B by the increase amount corresponding to the degree of oversteer DOS. Accordingly, the steering reaction force during oversteer is larger than the steering reaction force corresponding to the basic axial force AF_B. In this way, the steering wheel 10 can be easily turned back. That is, a countersteering operation during oversteer is assisted. Thus, the driver finds it easy to perform the countersteering operation.

As described above, the steer-by-wire system 1 of this embodiment can reproduce the appropriate steering feeling that corresponds to the vehicle state. In particular, even when the vehicle state is in the critical range such as an understeer range or an oversteer range, the appropriate steering feeling that corresponds to the vehicle state can be reproduced. Note that, in the above description, the processing related to only one of understeer and oversteer may be executed.

In addition, according to this embodiment, a sensor that directly detects the reaction force applied to the turning shaft 45 is unnecessary. This is preferable in view of cost reduction. Furthermore, according to this embodiment, a disturbance observer that estimates the reaction force applied to the turning shaft 45 is unnecessary. This is preferable in view of reducing a calculation load.

A description will hereinafter be provided on several examples related to the calculation of the final axial force AF_F in the steering reaction force control according to this embodiment.

Figure 6:
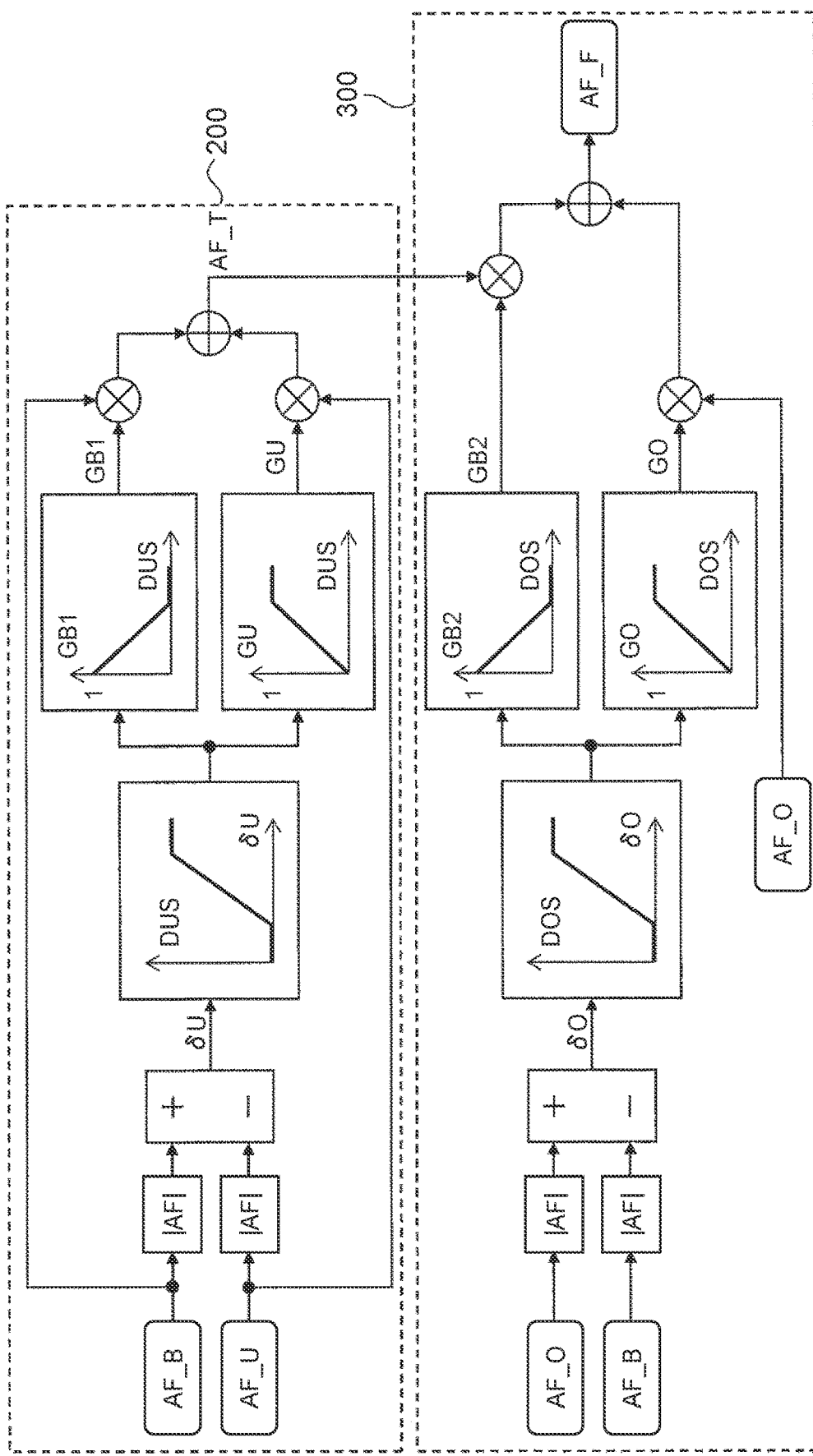
FIG. 6 is a conceptual view of a first example of calculation of a final axial force in steering reaction force control according to the embodiment of the disclosure.

FIG. 6 is a conceptual view of a first example. First, a block 200 in FIG. 6 will be described. The steering reaction force control unit 100R calculates a difference SU between the basic axial force AF_B and the under axial force AF_U. The difference SU is expressed by the following equation (12).

$$\delta U = |AF\_B| - |AF\_U| \qquad \text{Equation (12):}$$

Furthermore, the steering reaction force control unit 100R calculates the degree of understeer DUS that corresponds to the difference δU. There is a tendency that the degree of understeer DUS is increased (intensified) as the difference δU is increased. As shown in FIG. 6, a dead zone may be provided. A corresponding relationship between the difference δU and the degree of understeer DUS is defined in advance and is provided in a form of a map or an equation. Referring to the corresponding relationship, the steering reaction force control unit 100R calculates the degree of understeer DUS that corresponds to the difference δU. Note that the calculation of the difference δU and the degree of understeer DUS corresponds to the processing executed by the state determination section 130.

Next, the steering reaction force control unit 100R calculates a first basic axial force gain GB1 and an under axial force gain GU on the basis of the degree of understeer DUS. The first basic axial force gain GB1 is a weighting gain used to determine (decide) a degree of contribution of the basic axial force AF_B to the final axial force AF_F. The under axial force gain GU is a weighting gain used to determine (decide) a degree of contribution of the under axial force AF_U to the final axial force AF_F.

As shown in FIG. 6, the first basic axial force gain GB1 is reduced from 1 as the degree of understeer DUS is increased (intensified). On the other hand, the under axial force gain GU is increased toward 1 as the degree of understeer DUS is increased (intensified). A corresponding relationship between the degree of understeer DUS and the first basic axial force gain GB1 and a corresponding relationship between the degree of understeer DUS and the under axial force gain GU are defined in advance and are provided in the form of maps or equations. Referring to the corresponding relationships, the steering reaction force control unit 100R calculates the first basic axial force gain GB1 and the under axial force gain GU, each of which corresponds to the degree of understeer DUS.

The steering reaction force control unit 100R calculates a tentative axial force AF_T on the basis of the basic axial force AF_B, the first basic axial force gain GB1, the under axial force AF_U, and the under axial force gain GU. The tentative axial force AF_T is expressed by the following equation (13). Note that the under axial force AF_U in the equation (13) may be of a different kind from the under axial force AF_U in the above equation (12).

$$AF\_T = GB1 \times AF\_B + GU \times AF\_U \qquad \text{Equation (13):}$$

Next, a block 300 in FIG. 6 will be described. The steering reaction force control unit 100R calculates a difference δO between the basic axial force AF_B and the over axial force AF_O. The difference δO is expressed by the following equation (14).

$$\delta O = |AF\_O| - |AF\_B| \qquad \text{Equation (14):}$$

Furthermore, the steering reaction force control unit 100R calculates the degree of oversteer DOS that corresponds to the difference δO. There is a tendency that the degree of oversteer DOS is increased (intensified) as the difference δO is increased. As shown in FIG. 6, a dead zone may be provided. A corresponding relationship between the difference δO and the degree of oversteer DOS is defined in advance and is provided in the form of a map or an equation. Referring to the corresponding relationship, the steering reaction force control unit 100R calculates the degree of oversteer DOS that corresponds to the difference δO.

Next, the steering reaction force control unit 100R calculates a second basic axial force gain GB2 and an over axial force gain GO on the basis of the degree of oversteer DOS. The second basic axial force gain GB2 is a weighting gain used to determine (decide) a degree of contribution of the tentative axial force AF_T to the final axial force AF_F. The over axial force gain GO is a weighting gain used to determine (decide) a degree of contribution of the over axial force AF_O to the final axial force AF_F.

As shown in FIG. 6, the second basic axial force gain GB2 is reduced from 1 as the degree of oversteer DOS is increased (intensified). On the other hand, the over axial force gain GO is increased toward 1 as the degree of oversteer DOS is increased (intensified). A corresponding relationship between the degree of oversteer DOS and the second basic axial force gain GB2 and a corresponding relationship between the degree of oversteer DOS and the over axial force gain GO are defined in advance and are provided in the form of maps or equations. Referring to the corresponding relationships, the steering reaction force control unit 100R calculates the second basic axial force gain GB2 and the over axial force gain GO, each of which corresponds to the degree of oversteer DOS.

The steering reaction force control unit 100R calculates the final axial force AF_F on the basis of the tentative axial force AF_T, the second basic axial force gain GB2, the over axial force AF_O, and the over axial force gain GO. The final axial force AF_F is expressed by the following equation (15). Note that the over axial force AF_O in the equation (15) may be of a different kind from the over axial force AF_O in the above equation (14).

$$AF\_F = GB2 \times AF\_T + GO \times AF\_O \qquad \text{Equation (15):}$$

In the case of the normal range, both of the degree of understeer DUS and the degree of oversteer DOS are 0. Because the first basic axial force gain GB1 is 1 and the under axial force gain GU is 0, the tentative axial force AF_T is equal to the basic axial force AF_B (AF_T=AF_B). Furthermore, because the second basic axial force gain GB2 is 1 and the over axial force gain GO is 0, the final axial force AF_F is equal to the tentative axial force AF_T, that is, the basic axial force AF_B (AF_F=AF_B). The basic axial force AF_B is used as the final axial force AF_F, and thus the appropriate built-up feeling is reproduced.

During understeer, the degree of oversteer DOS is 0. Because the second basic axial force gain GB2 is 1 and the over axial force gain GO is 0, the final axial force AF_F is equal to the tentative axial force AF_T (AF_F=AF_T). The tentative axial force AF_T is expressed by the above equation (13). As the degree of understeer DUS is increased (intensified), the first basic axial force gain GB1 is reduced while the under axial force gain GU is increased. In addition, the under axial force AF_U during understeer is smaller than the basic axial force AF_B. As a result, the calculated final axial force AF_F becomes smaller than the basic axial force AF_B (AF_F<AF_B). By reducing the final axial force AF_F to a value smaller than the basic axial force AF_B, the steering reaction force is reduced, and the "steering force reducing feeling" during understeer is reproduced.

Note that the fifth axial force AF5 may be particularly used as the under axial force AF_U. As described above, the fifth axial force AF5 is the "early changed axial force". That is, the change in the fifth axial force AF5 starts earlier than the changes in the other axial forces AF2 to AF4. By using the fifth axial force AF5 as the under axial force AF_U, an understeer state can be detected at an earlier stage. As a result, the steering reaction force suitable for the understeer state can be generated at the earlier stage.

During oversteer, the degree of understeer DUS is 0. Because the first basic axial force gain GB1 is 1 and the under axial force gain GU is 0, the tentative axial force AF_T is equal to the basic axial force AF_B (AF_T=AF_B). Thus, the above equation (15) becomes the following equation (16).

$$AF\_F = GB2 \times AF\_B + GO \times AF\_O \qquad \text{Equation (16):}$$

As the degree of oversteer DOS is increased (intensified), the second basic axial force gain GB2 is reduced while the over axial force gain GO is increased. In addition, the over axial force AF_O during oversteer is larger than the basic axial force AF_B. As a result, the calculated final axial force AF_F becomes larger than the basic axial force AF_B (AF_F>AF_B). By increasing the final axial force AF_F to a value larger than the basic axial force AF_B, the steering reaction force is increased, and the countersteering operation is appropriately assisted.

Figure 7:
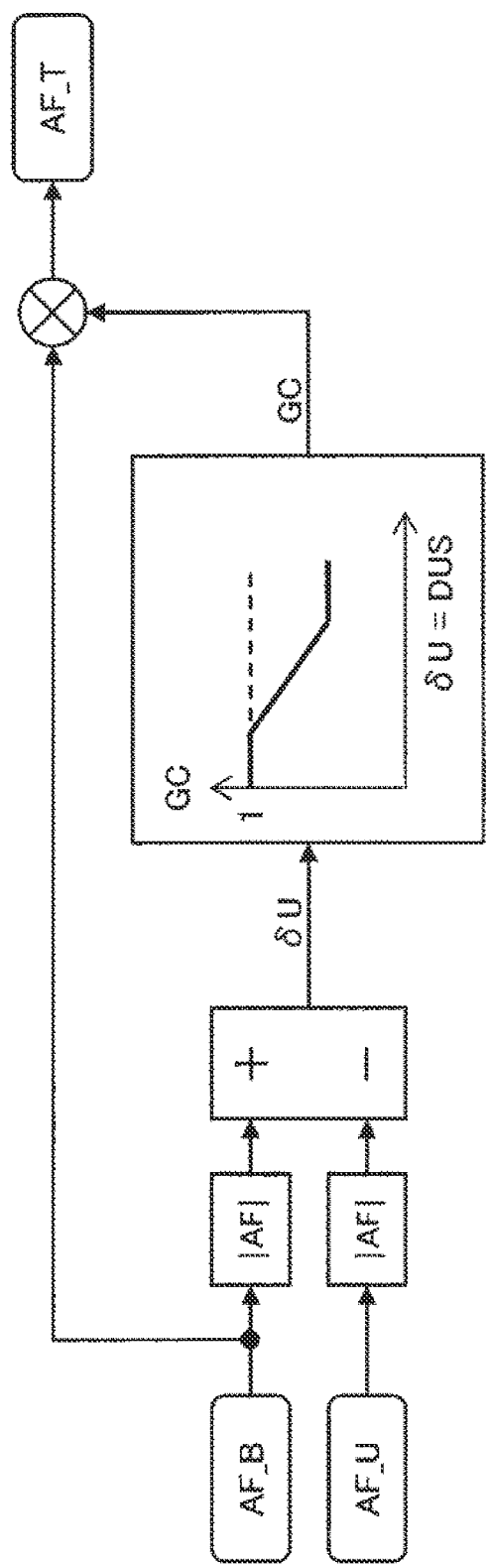
FIG. 7 is a conceptual view of a second example of the calculation of the final axial force in the steering reaction force control according to the embodiment of the disclosure.

FIG. 7 is a conceptual view of a second example. In the second example, a modified example of the block 200 (the processing related to understeer) in FIG. 6 will be described. The difference δU is the same as that in the first example and is expressed by the above equation (12). In the second example, this difference δU itself corresponds to the degree of understeer DUS (DUS=δU), and the calculation of the difference δU corresponds to the processing executed by the state determination section 130.

The steering reaction force control unit 100R calculates a correction gain GC corresponding to the degree of understeer DUS (the difference δU). The correction gain GC is equal to or smaller than 1 and tends to be reduced as the degree of understeer DUS is increased (intensified). As shown in FIG. 7, a dead zone may be provided. A corresponding relationship between the degree of understeer DUS and the correction gain GC is defined in advance and is provided in the form of a map or an equation. Referring to the corresponding relationship, the steering reaction force control unit 100R calculates the correction gain GC corresponding to the degree of understeer DUS.

As described above, the final axial force AF_F during understeer is equal to the tentative axial force AF_T. The steering reaction force control unit 100R calculates the tentative axial force AF_T, that is, the final axial force AF_F by multiplying the basic axial force AF_B by the correction gain GC (AF_F=AF_T=GC×AF_B). The correction gain GC is reduced as the degree of understeer DUS is increased (intensified). As a result, the calculated final axial force AF_F becomes smaller than the basic axial force AF_B (AF_F<AF_B). By reducing the final axial force AF_F to a value smaller than the basic axial force AF_B, the steering reaction force is reduced, and the "steering force reducing feeling" during understeer is reproduced.

Note that the fifth axial force AF5 may be particularly used as the under axial force AF_U. By using the fifth axial force AF5 as the under axial force AF_U, the understeer state can be detected at the earlier stage. As a result, the steering reaction force suitable for the understeer state can be generated at the earlier stage.

Figure 8:
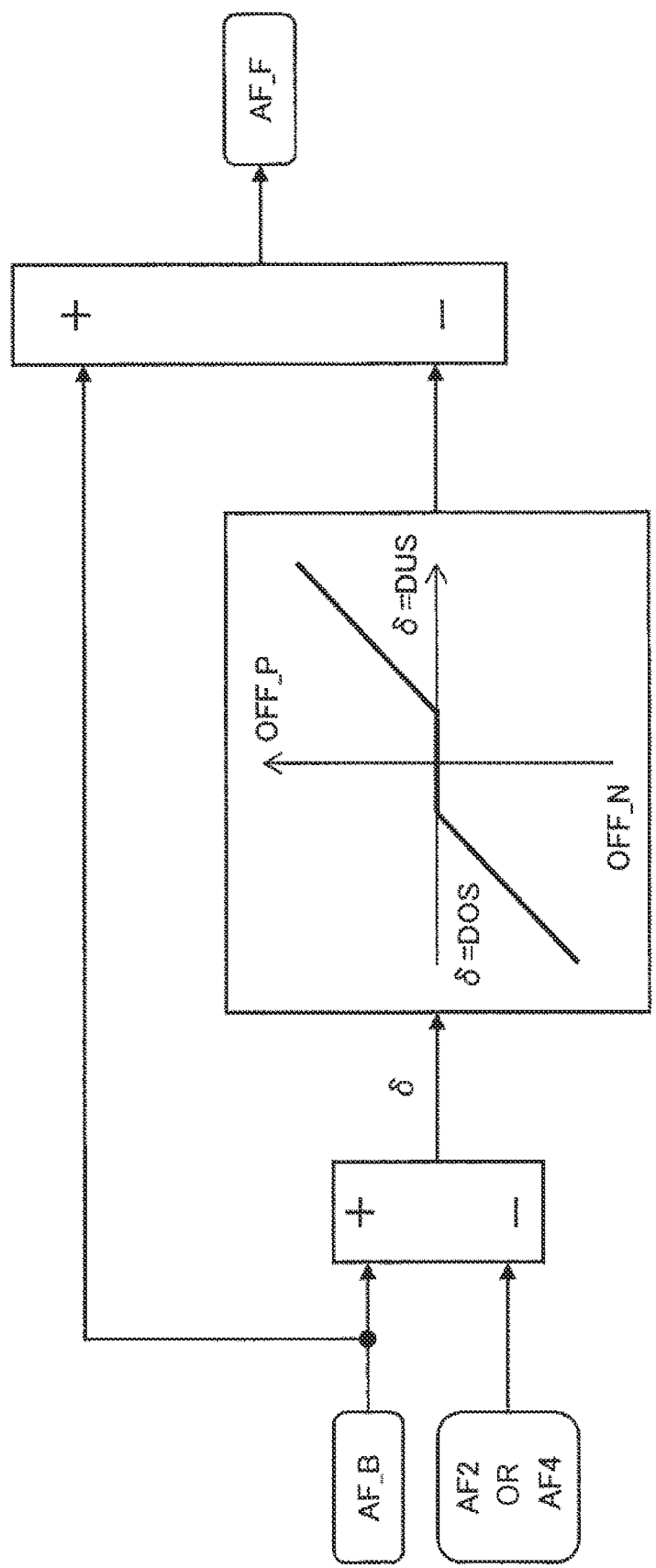
FIG. 8 is a conceptual view of a third example of the calculation of the final axial force in the steering reaction force control according to the embodiment of the disclosure.

FIG. 8 is a conceptual view of a third example. In the third example, the second axial force AF2 or the fourth axial force AF4 is used together with the basic axial force AF_B. As described above, each of the second axial force AF2 and the fourth axial force AF4 has both the property of the under axial force AF_U and the property of the over axial force AF_O. As will be described below, the processing can be simplified by using the second axial force AF2 or the fourth axial force AF4 with the above-described properties.

For example, a case where the second axial force AF2 is used will be considered. The same applies to a case where the fourth axial force AF4 is used. The steering reaction force control unit 100R calculates a difference δ between the basic axial force AF_B and the second axial force AF2. The difference δ is expressed by the following equation (17).

$$\delta = AF\_B - AF2 \quad \text{Equation (17):}$$

In the third example, this difference δ corresponds to the degree of understeer DUS or the degree of oversteer DOS.

During understeer, the second axial force AF2 becomes smaller than the basic axial force AF_B, and therefore, the difference δ has a positive value. This positive difference δ corresponds to the degree of understeer DUS. During oversteer, the second axial force AF2 becomes larger than the basic axial force AF_B, and therefore, the difference δ has a negative value. This negative difference δ corresponds to the degree of oversteer DOS. Note that the calculation of the difference δ corresponds to the processing executed by the state determination section 130.

Next, the steering reaction force control unit 100R calculates an offset OFF that corresponds to the difference δ. The offset OFF in the case where the difference δ has the positive value is a positive offset OFF_P. The offset OFF in the case where the difference δ has the negative value is a negative offset OFF_N. There is a tendency that an absolute value of the offset OFF (OFF_P, OFF_N) is increased as an absolute value of the difference δ is increased. As shown in FIG. 8, a dead zone may be provided. A corresponding relationship between the difference δ and the offset OFF is defined in advance and is provided in the form of a map or an equation. Referring to the corresponding relationship, the steering reaction force control unit 100R calculates the offset OFF that corresponds to the difference δ.

Next, the steering reaction force control unit 100R calculates the final axial force AF_F on the basis of the basic axial force AF_B and the offset OFF. In detail, the final axial force AF_F is expressed by the following equation (18).

$$AF\_F = AF\_B - \text{OFF} \quad \text{Equation (18):}$$

In the case of the normal range, the difference δ is 0, and the offset OFF is 0. Accordingly, the calculated final axial force AF_F becomes equal to the basic axial force AF_B (AF_F=AF_B). The basic axial force AF_B is used as the final axial force AF_F, and thus the appropriate built-up feeling is reproduced.

During understeer, the offset OFF is the positive offset OFF_P. Accordingly, the final axial force AF_F becomes smaller than the basic axial force AF_B (AF_F<AF_B) by an amount of the offset OFF_P (a first offset amount). The first offset amount is increased as the difference δ (the degree of understeer DUS) is increased. By reducing the final axial force AF_F to a value smaller than the basic axial force AF_B, the steering reaction force is reduced, and the "steering force reducing feeling" during understeer is reproduced.

During oversteer, the offset OFF is the negative offset OFF_N. Accordingly, the final axial force AF_F becomes larger than the basic axial force AF_B (AF_F>AF_B) by an absolute value of the offset OFF_N (a second offset amount). The second offset amount is increased as the difference δ (the degree of oversteer DOS) is increased. By increasing the final axial force AF_F to a value larger than the basic axial force AF_B, the steering reaction force is increased, and the countersteering operation is appropriately assisted.

A fourth example will be described. There is a situation where friction at the time when the rotation of the turning motor 41 is transmitted to the turning shaft 45 is increased in the turning device 40 shown in FIG. 1. For example, a case where a ball screw is used to transmit the rotation of the turning motor 41 to the turning shaft 45 will be considered. Under a low-temperature condition, viscosity of grease on the ball screw is increased, which results in an increase of the friction.

The fifth axial force AF5, which is calculated on the basis of the turning current Im, is influenced by such friction. In a situation where the friction is increased, accuracy of the fifth axial force AF5 is degraded. Thus, it is preferable that the fifth axial force AF5 should not be used. For example, the steer-by-wire system 1 is further provided with a temperature sensor (not shown). Under the low-temperature condition where a temperature detected by the temperature sensor is equal to or lower than a threshold, the steering reaction force control unit 100R eliminates the fifth axial force AF5 from the under axial forces AF_U. In this way, degradation of processing accuracy under the low-temperature condition can be prevented.

What is claimed is:

1. A steer-by-wire system mounted in a vehicle, the steer-by-wire system comprising:
    a turning device configured to turn a wheel of the vehicle; and
    a steering reaction force control unit configured to control a steering reaction force applied to a steering wheel, wherein:
    the steering reaction force control unit is configured to calculate a plurality of kinds of axial forces with use of different parameters, calculates a final axial force based on the plurality of kinds of axial forces, and generates the steering reaction force corresponding to the final axial force;
    the plurality of kinds of axial forces include a basic axial force that is calculated based on a turning angle of the wheel or a steering angle of the steering wheel, and an under axial force that becomes smaller than the basic axial force during understeer; and
    the steering reaction force control unit is configured to calculate a degree of understeer that reflects a difference between the basic axial force and the under axial force during the understeer and to reduce the final axial force during the understeer to a value smaller than the basic axial force by an amount corresponding to the degree of understeer.

2. The steer-by-wire system according to claim 1, wherein:
    the steering reaction force control unit is configured to calculate the final axial force during the understeer based on a sum of a product of the basic axial force and a first basic axial force gain and a product of the under axial force and an under axial force gain; and
    the steering reaction force control unit is configured to reduce the first basic axial force gain and increases the under axial force gain as the degree of understeer is increased.

3. The steer-by-wire system according to claim 1, wherein:
    the steering reaction force control unit is configured to calculate the final axial force during the understeer by multiplying the basic axial force by a correction gain that is equal to or smaller than 1; and
    the steering reaction force control unit is configured to reduce the correction gain as the degree of understeer is increased.

4. The steer-by-wire system according to claim 1, wherein:
    the turning device includes a turning motor that is connected to the wheel via a turning shaft;
    the plurality of kinds of axial forces include an early changed axial force that is calculated based on a turning current that drives the turning motor; and
    the early changed axial force is used as the under axial force.

5. The steer-by-wire system according to claim 1, wherein:
    the plurality of kinds of axial forces further include an over axial force that becomes larger than the basic axial force during oversteer; and
    the steering reaction force control unit is configured to calculate a degree of oversteer that reflects a difference between the basic axial force and the over axial force during the oversteer and increases the final axial force during the oversteer to a value larger than the basic axial force by an amount corresponding to the degree of oversteer.

6. The steer-by-wire system according to claim 5, wherein:
    the steering reaction force control unit is configured to calculate the final axial force during the oversteer based on a sum of a product of the basic axial force and a second basic axial force gain and a product of the over axial force and an over axial force gain; and
    the steering reaction force control unit is configured to reduce the second basic axial force gain and increases the over axial force gain as the degree of oversteer is increased.

7. The steer-by-wire system according to claim 1, wherein:
    the steering reaction force control unit is configured to calculate the final axial force during the understeer by subtracting a first offset amount from the basic axial force; and
    the steering reaction force control unit is configured to increase the first offset amount as the degree of understeer is increased.

8. The steer-by-wire system according to claim 7, wherein:
    the steering reaction force control unit is configured to calculate the final axial force during oversteer by adding a second offset amount to the basic axial force;
    the plurality of kinds of axial forces further include an over axial force that becomes larger than the basic axial force during the oversteer; and
    the steering reaction force control unit is configured to calculate a degree of oversteer that reflects a difference between the basic axial force and the over axial force and increases the second offset amount as the degree of oversteer is increased.

9. A steer-by-wire system mounted in a vehicle, the steer-by-wire system comprising:
    a turning device configured to turn a wheel of the vehicle; and
    a steering reaction force control unit configured to control a steering reaction force applied to a steering wheel, wherein:
    the steering reaction force control unit is configured to calculate a plurality of kinds of axial forces with use of different parameters, calculates a final axial force based on the plurality of kinds of axial forces, and generates the steering reaction force corresponding to the final axial force;
    the plurality of kinds of axial forces include a basic axial force that is calculated based on a turning angle of the wheel or a steering angle of the steering wheel, and an over axial force that becomes larger than the basic axial force during oversteer; and
    the steering reaction force control unit is configured to calculate a degree of oversteer that reflects a difference between the basic axial force and the over axial force during the oversteer and increases the final axial force during the oversteer to be larger than the basic axial force by an amount corresponding to the degree of oversteer.

10. The steer-by-wire system according to claim 9, wherein:
the steering reaction force control unit is configured to calculate the final axial force during the oversteer based on a sum of a product of the basic axial force and a basic axial force gain and a product of the over axial force and an over axial force gain; and
the steering reaction force control unit is configured to reduce the basic axial force gain and increases the over axial force gain as the degree of oversteer is increased.

* * * * *